United States Patent [19]

Suris

[11] 4,305,444
[45] Dec. 15, 1981

[54] SECURITY TIRE

[76] Inventor: Ernesto Suris, 2496 SW. 17 Ave., Apt. 5311, Miami, Fla. 33145

[21] Appl. No.: 133,004

[22] Filed: Mar. 24, 1980

[51] Int. Cl.³ .............................................. B60C 17/00
[52] U.S. Cl. ................................... 152/158; 152/165; 152/325; 152/330 RF; 152/363
[58] Field of Search ............. 152/158, 330 RF, 330 L, 152/165, 325, 327, 329, 339, 363, 328, 324, 209 R

[56] References Cited

U.S. PATENT DOCUMENTS 1,251,077  12/1917  Mayhew .......................... 152/158 X
1,534,365   4/1925  Dunn ..................................... 152/158
3,367,381   2/1968  Aghnides ............................ 152/158
3,945,419   3/1976  Kosanke .......................... 152/158 X Primary Examiner—William A. Powell
Assistant Examiner—Thomas Bokan
Attorney, Agent, or Firm—John Cyril Malloy

[57] ABSTRACT

A pneumatic tire and rim combination wherein the tire is captivated about the rim and a chamber is defined between the tire and the rim and a portion of the tire extends into the chamber within the carcass of the tire and serves as an annular support structure upon deflation of air within the tire, so that if it collapses, as by a blowout, a vehicle on which it is installed will continue to be supported by the tire as the interiorly extending annular portion of the tire engages the confronting surface of the rim.

2 Claims, 3 Drawing Figures

SECURITY TIRE

FIELD OF THE INVENTION

This invention relates to vehicle tires and, more particularly, to a safety tire for vehicles.

BACKGROUND OF THE INVENTION

This invention is concerned with a safety tire with an annular portion extending inwardly within the chamber of the tire so that, when the tire is deflated, as by a blowout, the chamber will not collapse completely; but, rather, the interior of the annular portion will engage the rim and support will be provided.

OBJECTS OF THE INVENTION

A main object and advantage of using the safety tire or security tire are that the tire will not completely collapse causing a serious accident while it is in motion and, in the event of a blowout provide a safe drive to a location at which the tire can be removed and replaced.

The tire of the instant invention includes as a portion of the interior of the tire a radially inwardly projecting annular ring or support to engage the rim upon loss of pressure within the tire so that a resilient support is provided and a vehicle can be driven to a safe place. Optionally the tire may be provided as standard equipment on a car when it is sold so that it can be readily installed and used as required.

It is thus seen that it is not necessary when one using this tire has a blowout to require a tow to a safe place; but, rather, when a tire has been damaged, the auto can, nevertheless, be driven with effective emergency support to a safe location for changing.

The instant invention will add to the life of the tire since it will provide a saving in the amount of damage caused to a tire upon loss of deflation in those situations where the event occurs in an unsafe place, so that it can be driven to a safe place to be changed.

It will further be appreciated that upon loss of pressure in a tire, by reason of the interior support provided by this invention, the operator will not be apt to lose control of the vehicle since there will not be an abrupt loss in the elevation of the tire which will mechanically take up the weight of the tire so that it can be driven smoothly and under control to a safe place.

In preferred embodiments, the weight, height, and diameter of the tire will vary in relation to the size of the tire but will generally provide two inches between the interior of the tire and the insert so that, in the case of a flat tire, the loss of interior support space, represented by the loss of the pressure will be minimal.

In a preferred embodiment the tire and annular portion may be reinforced natural or synthetic rubbery material; or, as it is known, caucho, having enough flexibility to accommodate mounting of the tire to a rim.

It is, accordingly, an object of this invention to provide an improved tire wherein, within the interior chamber of the tire, there is provided an annular member which is adapted to support the weight of a vehicle, upon loss of pressure within the tire.

It is, also, an object of this invention to provide an annular support structure as part of the tire to provide support between the tire and the rim so that, upon loss of pressure within the chamber of the tire, the vehicle will continue to be supported without dramatic effect, such as loss of control in the event of a blowout.

It is a particular object of this invention to provide an improved tire which is of rubbery material so that, upon loss of pressure, the tire will continue to provide support for the vehicle upon which it is installed.

It is also an object of this invention to provide an interior annularly extending member radially depending from the outer portion of the tire and extending toward but not to the rim of the tire in a normal configuration and wherein, upon loss of pressure within the tire, the tire will rest upon the rim without complete collapse thereof.

In accordance with these and other objects which will become apparent hereinafter, the instant safety tire will now be described with reference to the accompanying drawings in which:

DESCRIPTION OF THE PREFERRED EMBODIMENT

Figure 1:
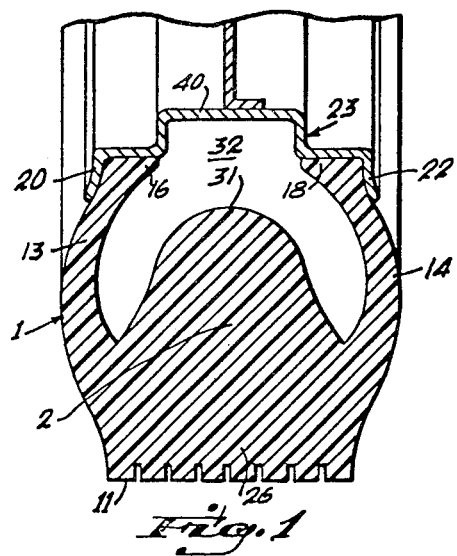
FIG. 1 is a side view in cross section of a portion of a tire and rim and illustrating the invention when the tire is inflated.
Figure 2:
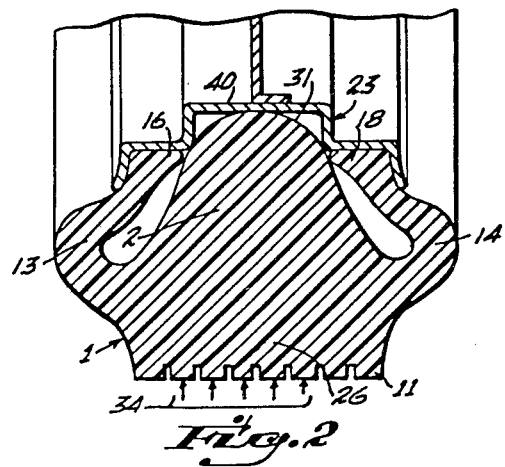
FIG. 2 is a view similar to FIG. 1 and illustrating the tire when it has been deflated.

Referring to the drawings wherein like reference characters designate like or corresponding parts throughout the several views and referring particularly to FIG. 1, there is shown a tire generally designated by the numeral 1 having tread on the exterior as designated by the numeral 11 and which carcass has side flanges 13 and 14 with ends 16 and 18 defining an open channel and wherein the terminal ends are captivated between the sides 20 and 22 of a tire rim generally designated by the numeral 23. Referring to the tire, it is seen that the inside of the central portion designated by the numeral 26 there is an inwardly projecting circumferentially extending bulbous body portion 2 which has an inner curved end 31. In use, when air escapes from the space designated by the numeral 32, the bulbous body will be depressed by the forces of the weight of the car indicated by the arrowed lines 34 until the bulbous body along the zone 31, rests on the ledge or spacer member 40. In this manner, the weight is taken up by the tire, notwithstanding the loss of air and the driver may drive to a safe place to change the tire. It is thus seen that there is provided a security tire with a bulbous body extending radially inwardly from the outer portion of the tread to rest on the interior of the rim between the sides when the tire becomes deflated for whatever cause, so that with loss of air, the tire will not go completely flat and may be driven to a safe place to be changed. The body of the side tire flanges 13 and 14 will be bowed outwardly somewhat but, in any event, the driver is able to drive the vehicle to a safe place to change the tire.

Figure 3:
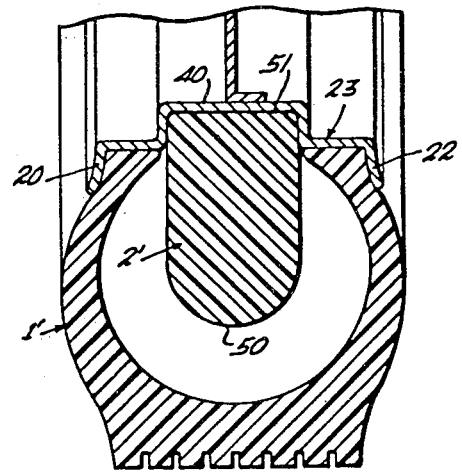
FIG. 3 is a slightly modified embodiment illustrating the instant invention in the form of a circumferential body arranged within the chamber of the tire.

FIG. 3 is an alternative embodiment illustrated of the instant invention and it is composed of a conventional tire designated by the numeral 1' and, additionally, an interior annular member designated by the numeral 2' which is of solid rubbery material and which has a radially outwardly extending dome surface 50 and an interior flat surface radially inwardly from the dome surface which is designated by the numeral 51 and which is sized to rest on the spacer 40 between the sides of the tire rim 20 and 22.

In use, the solid rubbery annular ring insert is inserted into the tire and, in the preferred embodiment, for ease of insertion, it is of a slightly larger diameter than is the diameter of the spacer 40 so that it will nest within the tire between the side flanges, thus the rim may be considered to be a rigid annular symmetrical structure defining an annular seat having a central radially inwardly extending annular recessed rim surface of a predetermined lateral circumferential and recessed dimension.

The annular member may be hollow so that it can be buckled and deformed so as to be inserted conveniently and placed in the correct position. In any event, when inflation is lost in the main chamber of the tire, the interior of the tire will engage the solid member that is the annular member, which is solid in the preferred embodiment, and provides support, notwithstanding the loss of air, until the vehicle can be driven to a suitable location for changing of the tire.

What is claimed is:

1. A matingly sized tire and rim, in combination:

said rim comprising a rigid annular symmetrical structure defining an annular seat having a central radially inwardly extending annular recessed rim surface of a predetermined lateral circumferential and recessed dimension, said seat including a laterally extending surface extending from the opposite sides of the recess, each surface terminating at a radially outturned shoulder, said laterally extending surfaces and said shoulder each being of a common second predetermined dimension; and said tire including a first and a second spaced ends said first end being sized to nest on one each of the laterally extending surfaces of the seat outboard of the recess and being captivated on said rim by one said shoulder and said second end being sized to nest on the other laterally extending surface of the seat outboard of the recess and being captivated on said rim by the other said shoulder, said tire including said spaced ends, side walls and an outer tread zone and defining a hollow annular inner chamber, said tire including an integral radially inwardly extending portion on solid material on the tread surface, said portion normally extending into the annular chamber toward but not to the recessed rim surface, said portion having a terminal end which is arcuate and of a lateral dimension adjacent said terminal end greater than the lateral dimension of said recess, said portion being of rubbery material throughout and being adapted to nest within the recess in deformed relation in response to radially inward pressure to yieldingly and resiliently support weight upon said tire when said tire is deflated and to be normally in spaced relation from the recessed rim surface.

2. The device as set forth in claim 1 wherein said portion is of rubber.

* * * * *